United States Patent
Maass (10) Patent No.: US 7,620,497 B2
(45) Date of Patent: Nov. 17, 2009

(54) METHOD AND DEVICE FOR INFORMING A DRIVER OR FOR REACTING WHEN THE VEHICLE LEAVES A LANE

(75) Inventor: Alexander Maass, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 731 days.

(21) Appl. No.: 10/510,398

(22) PCT Filed: Apr. 16, 2003

(86) PCT No.: PCT/DE03/01274

§ 371 (c)(1),
(2), (4) Date: Oct. 5, 2004

(87) PCT Pub. No.: WO03/094130

PCT Pub. Date: Nov. 13, 2003

(65) Prior Publication Data
US 2005/0182539 A1    Aug. 18, 2005

(30) Foreign Application Priority Data

Apr. 30, 2002 (DE) ................... 102 19 494
Mar. 17, 2003 (DE) ................... 103 11 518

(51) Int. Cl.
*G08G 1/16* (2006.01)
*B62D 6/00* (2006.01)

(52) U.S. Cl. .............. 701/301; 701/41; 701/116; 701/117; 340/435; 340/436; 340/438; 340/995.21; 180/280

(58) Field of Classification Search ............ 701/41, 701/117, 301, 116; 340/435, 436, 438, 995.21; 180/280
See application file for complete search history.

(56) References Cited

U.S. PATENT DOCUMENTS

| 4,348,652 | A | | 9/1982 | Barnes et al. ........... 340/904 |
| 4,970,653 | A | * | 11/1990 | Kenue ................. 701/301 |
| 5,225,827 | A | | 7/1993 | Persson ................ 340/904 |
| 5,351,044 | A | * | 9/1994 | Mathur et al. ........... 340/901 |
| 5,521,579 | A | | 5/1996 | Bernhard ............... 340/438 |
| 5,913,375 | A | * | 6/1999 | Nishikawa .............. 180/168 |
| 5,982,278 | A | | 11/1999 | Cuvelier ............... 340/436 |
| 6,009,377 | A | * | 12/1999 | Hiwatashi .............. 701/301 |
| 6,154,123 | A | * | 11/2000 | Kleinberg .............. 340/436 |
| 6,185,492 | B1 | * | 2/2001 | Kagawa et al. .......... 701/41 |
| 6,370,474 | B1 | * | 4/2002 | Hiwatashi et al. ....... 701/300 |
| 6,449,383 | B1 | * | 9/2002 | Oike et al. ............ 382/104 |
| 6,487,501 | B1 | * | 11/2002 | Jeon .................. 701/301 |

(Continued)

FOREIGN PATENT DOCUMENTS

EP    1 074 430    2/2001

(Continued)

Primary Examiner—Jack W. Keith
Assistant Examiner—Chuong P Nguyen
(74) Attorney, Agent, or Firm—Kenyon & Kenyon LLP (57) ABSTRACT

A method and a device for driver information and for a reaction upon leaving the traffic lane by a vehicle. In this context, the course of at least one edge marking of the traffic lane is ascertained, the track of the vehicle that is to be expected is determined, and as a function of these variables the possible leaving of the traffic lane by the vehicle is ascertained. In the determination of the track of the vehicle, future reactions of the driver are taken into consideration.

8 Claims, 6 Drawing Sheets

U.S. PATENT DOCUMENTS 6,493,619 B2 * 12/2002 Kawazoe et al. .............. 701/41
6,580,986 B1 * 6/2003 Uenuma et al. ............... 701/41
6,675,094 B2 * 1/2004 Russell et al. ................ 701/301
6,756,903 B2 * 6/2004 Omry et al. .................. 340/576
6,778,890 B2 * 8/2004 Shimakage et al. ........... 701/41

FOREIGN PATENT DOCUMENTS

WO        WO 00/54008        *   9/2000

* cited by examiner

METHOD AND DEVICE FOR INFORMING A DRIVER OR FOR REACTING WHEN THE VEHICLE LEAVES A LANE

FIELD OF THE INVENTION

The present invention relates to a method and a device for driver information and a reaction upon departure from the lane, or, more accurately, in response to the threatening leaving of the lane.

BACKGROUND INFORMATION

Warning systems, which warn the driver when he leaves the lane, or rather, threatens to leave the lane, are known. For example, European Patent Application No. 1 074 430 discusses a method in which, based on image sensor systems, the lane in which the vehicle is moving is ascertained, and the driver is warned when the vehicle leaves the lane or threatens to do so. However, information on the exact boundary conditions, under which such a warning is given, is not stated.

SUMMARY OF THE INVENTION

By the driver's taking into account future corrections of the track (path) of the vehicle, in ascertaining whether, due to a future departure from the lane, he should be warned or not, it is possible effectively to avoid false warnings and, nevertheless, to maintain the reliability of the warning in response to the occurrence of the corresponding traffic situation.

This may allow recognition of a future departure from the lane in an exact and reliable manner. This fact and the suppression of false warnings, increases the operating friendliness, and the acceptance of a driver assistance system in which the driver is warned when the vehicle leaves the lane or upon future departure from the lane, or rather, reactions are introduced which lead the vehicle back to its normal lane (such as by a steering intervention).

In response to the estimation of the future path of the vehicle, future corrections of the path by the driver may be taken into consideration in an execution that includes his reaction time. This may lead to further improvement of accuracy and reliability of the system.

An average value of the correction measures of the driver, such as a steering angle value or a transverse acceleration value is predefined, and may be taken into consideration in determining the path. The state of attention of the driver may be taken into consideration in forming the magnitude of such a predefined value.

In the calculation of the future path of the vehicle, which is drawn upon to warn the driver when he leaves the lane, the state of attention of the driver may be taken into account in such a manner that the behavior of the driver in the past is ascertained, and, in response to behavior which leads one to conclude that the driver is inattentive, the possible future path of the vehicle may be calculated using a smaller change in the curvature than for a driver that is presumed to be attentive. The steering motions or the yaw rate changes in the past may be drawn upon for estimating the degree of attentiveness of the driver. Small steering motions designate an inattentive driver, and more forceful motions an attentive one.

DETAILED DESCRIPTION

Figure 1:
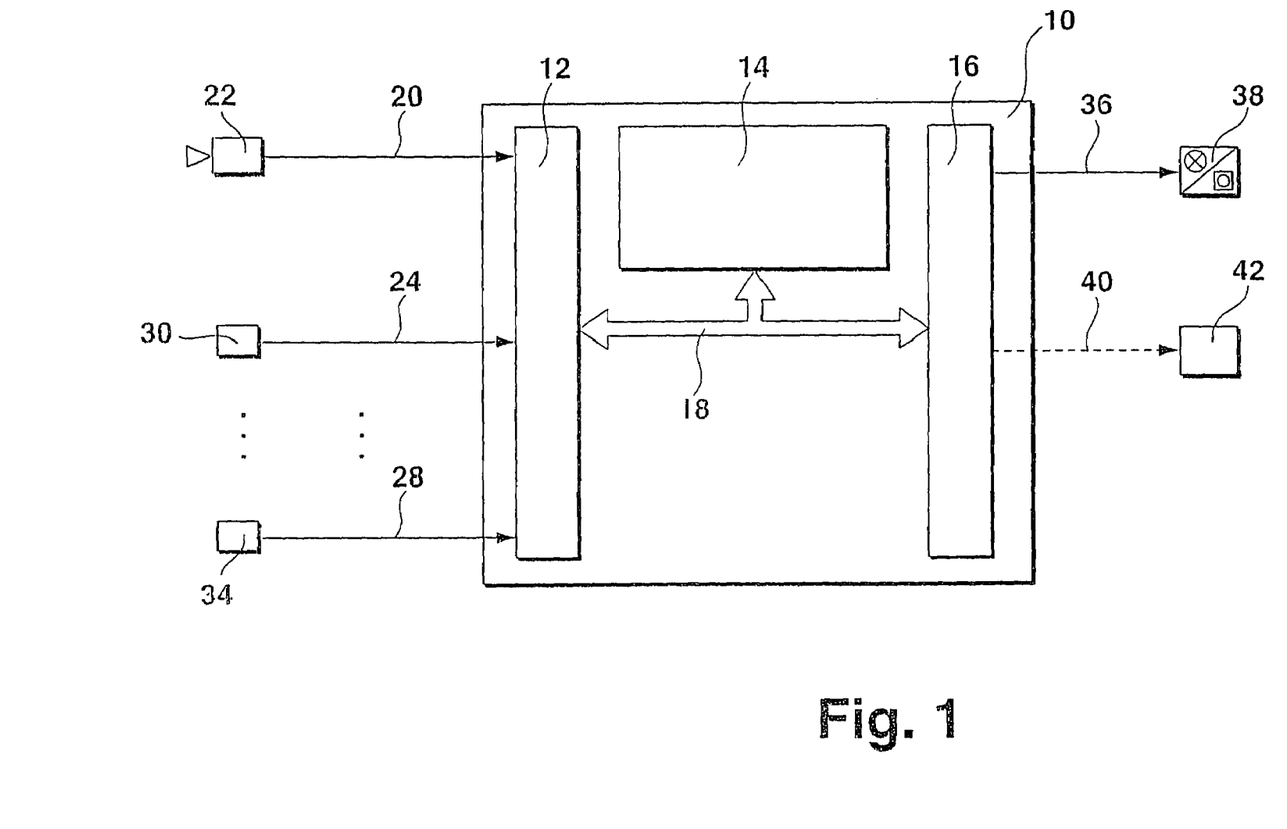
FIG. 1 shows a block diagram of a device for warning a driver and for a reaction when the vehicle threatens to leave the lane.

FIG. 1 shows a device used for warning a driver and for a reaction in response to future leaving of the lane of the vehicle. What is shown is a control or evaluation unit 10, which includes an input circuit 12, a microcomputer 14 and an output circuit 16. These elements are interconnected via a bus system for mutual data exchange. Input lines from various measuring devices, via which measuring signals and measuring data are transmitted, are supplied to input circuit 12. A first input line 20 connects input circuit 12 to an image sensor system 22, which picks up the scene in front of the vehicle. Corresponding image data are transmitted via input line 20. Furthermore, input lines 24 to 28 are provided which connect input circuit 12 to measuring devices 30 to 34. These measuring devices are, for example, measuring devices for measuring the vehicle speed, for recording the steering angle and for recording additional operating variables of the vehicle, which have meaning in connection with the method described below. At least one warning device 38 is activated via output circuit 16 and output line 36, for instance, a warning lamp and/or a loudspeaker for an acoustical warning or a voice response and/or a display for displaying an image, with the aid of which the driver is informed and/or warned before the departure, to be feared, from the lane, according to the method shown below. In addition, or alternatively, it is provided in some exemplary embodiments that one should activate a controlling system 42 via output circuit 16 and an output line 40, which automatically leads back into the lane, for instance by an intervention in the steering of the vehicle, and thus prevents leaving the lane.

According to the method described below, a warning or an intervention in the vehicle movement occurs when it is estimated that the driver is no longer able to hold the vehicle in the lane using normal corrections. To do this, a check is made whether, while considering normal corrections of the driver, i.e. a certain steering angle which the driver normally uses to correct his track, the vehicle crosses the edge markings or not. The future track of the vehicle is then specifically calculated while taking into consideration these corrections by the driver that are to be expected, is compared to the detected edge markings, and a warning is emitted if the future track of the vehicle crosses the edge markings. In the determination of the value represented by the correction of the track by the driver that is to be expected, in one supplementary exemplary embodiment, the state of attentiveness of the driver is taken into consideration. In this context, the value is the greater (this corresponds to a more forceful correction), the more attentive the driver is, and the less, the more inattentive the driver is. In this context, the attentiveness of the driver is derived, depending on the exemplary embodiment, from steering wheel movements, head posture, accelerator motion, etc.

In an additional exemplary embodiment, the reaction time of the driver is also estimated in connection with the detection of whether the vehicle will leave the lane in the future. It is assumed that, at the beginning of a warning, the driver will have a certain reaction. It has proven suitable to subdivide this reaction into several phases. In a first phase (of a duration such as 0.5 sec) no change in the steering angle occurs (reaction time of the driver to the warning); in a second phase, which borders on the first phase (of a duration such as 0.1 sec), the driver undertakes a correction away from the edge marking. He may, for example, turn the steering wheel by a certain angle (e.g. 10°) in the direction that brings the vehicle back into the lane. Alternatively to this, a rotation of the wheel is performed so that a curve is driven that has a transverse acceleration of 2 m/sec$^2$. In a third phase, which borders on the second phase, driving continues at an unchanged steering angle, until the vehicle moves in the direction of the center of the lane. Under consideration this behavior pattern, the future track for each point in time, which the vehicle will travel in case of a warning, is calculated. From this variable, the suitable point in time of the warning may then be derived, which has to occur exactly when the track, calculated in consideration of the driver's reaction, crosses the corresponding lane marking by a desired measure (which may also be negative). The range of distance in which the comparison with the edge marking occurs is limited, in this context (for instance, to 1 sec). These measures ensure that, in each lane-leaving situation, after a warning, the driver gets away from his own lane at most only by a certain measure.

Alternatively, or in supplement of the warning, an intervention in the vehicle movement occurs, e.g. in the steering, by which the vehicle gets back to the track again in a lane-leaving situation as described above.

The above-described methods are implemented using programs which are programmed on microcomputer 14. The latter generates the output signals for the warning or vehicle intervention, with the aid of the programs and according to the input signals supplied. In the light of flow diagrams, two exemplary embodiments of the method represented above are shown below.

Figure 2:
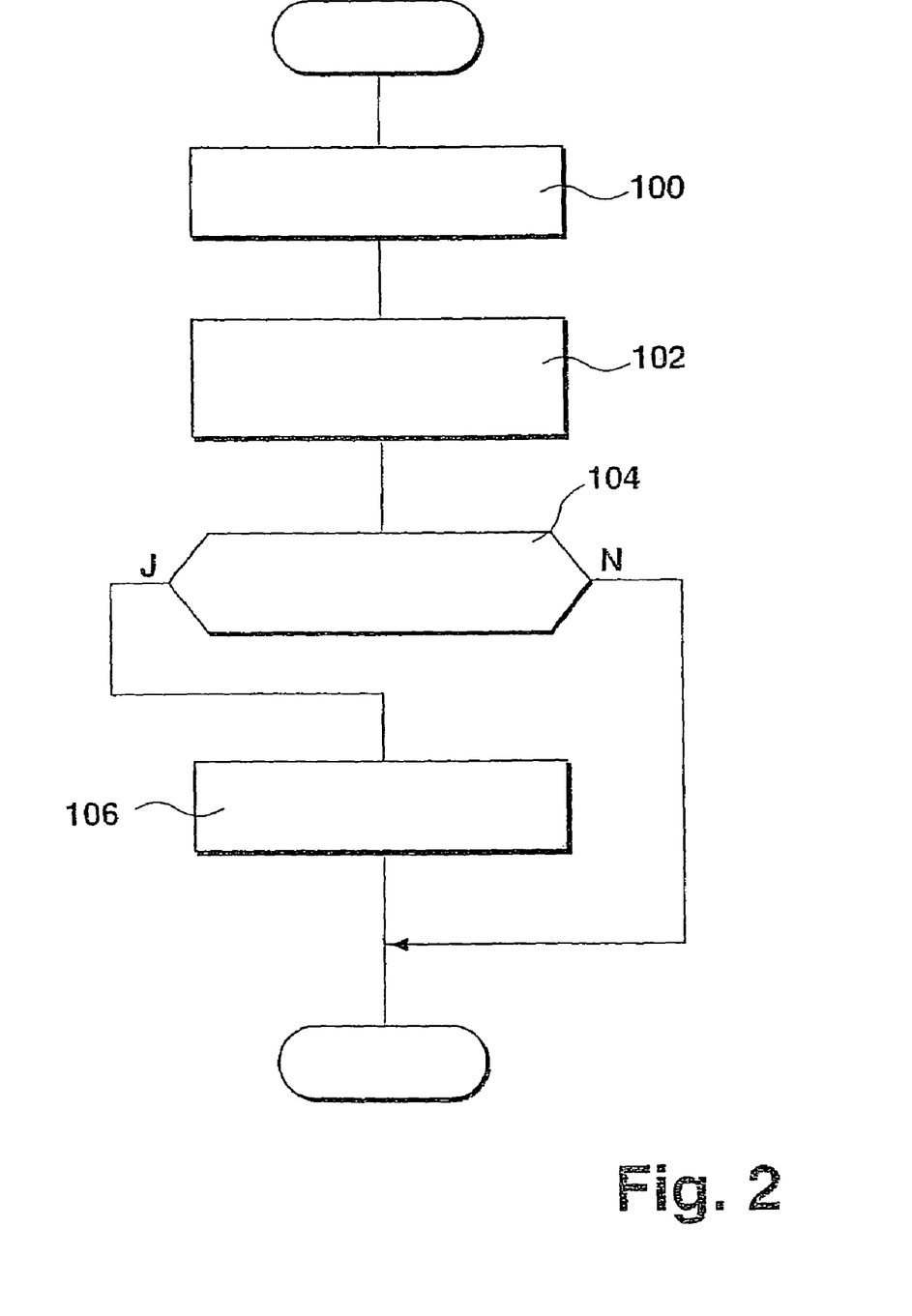
FIG. 2 shows a sketch of a flow chart in which a first method for determining the driver warning is shown.

A first exemplary embodiment is described in the light of the flow chart of FIG. 2. In this context, the program represented is run through at certain points in time.

In first step 100, the sequence of the lane marking (such as left and/or right lane edge) is read in. The sequence of the lane marking is given, in this context, in one exemplary embodiment as a polynomial, such as a third order power function. This function is derived from the image data ascertained by the image sensor system In this context, the microcomputer, using object recognition measures, recognizes the markings, and calculates the parameters of the power function from the recognized markings. In subsequent step 102 the future track of the vehicle is then calculated. The representation of this track also occurs using the function type that is used for the sequence of the lane markings. Accordingly, for example, from the current vehicle speed, the current steering angle or the transverse acceleration, etc, the parameters of the function are calculated which calculate the pattern of at least one track (track of the left and/or right vehicle edge) of the vehicle. An additional variable, that is evaluated for the calculation of the parameters, is the predefined correction value that may be a function of the attentiveness state, which is worked in, for example, by the correction of the steering angle. In subsequent step 104 the two functions are then checked as to whether they intersect or whether the future vehicle track lies across the pattern of the edge markings beyond a certain measure, or whether the future vehicle track is approaching the edge markings up to a certain measure. The distance range (distance from the vehicle), to which this comparison is limited, is predefined, in this context, (e.g. 1 sec), or is predefined by the maximum measuring distance of the image sensor system. If no crossing (point of intersection) is ascertained, one must assume that the vehicle remains in the lane, and the program is ended. If, however, a crossing of the two track curves are ascertained, then, according to step 106 a warning to the driver occurs, using acoustical and/or optical arrangement, and in one exemplary embodiment an automatic correction of the track of the vehicle, for example, by an intervention in the steering of the vehicle. The program is then ended and run through again at the next point in time.

Figure 3A:
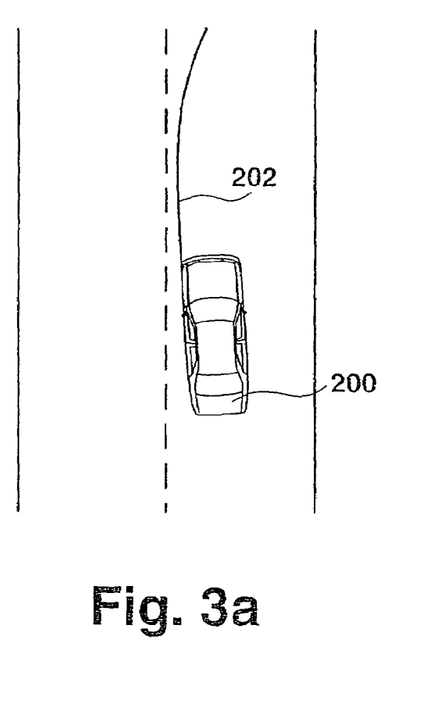
FIG. 3a shows a sketch of a traffic situation.
Figure 3B:
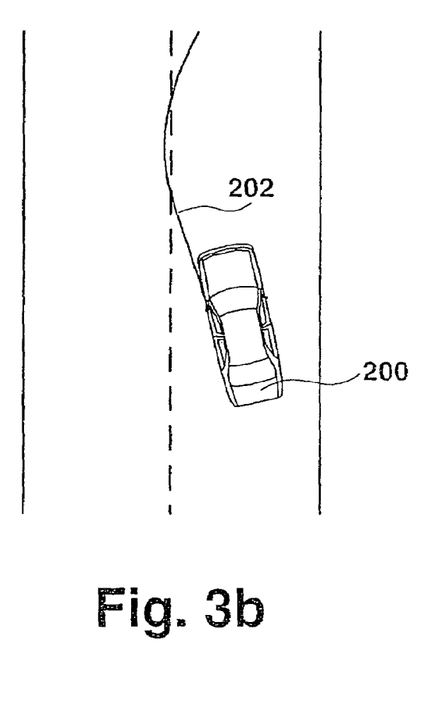
FIG. 3b shows a sketch of a traffic situation.

FIG. 3 shows two traffic situations, according to FIG. 3$a$, no driver warning occurs, and according to FIG. 3$b$, a driver warning occurs. Future lane 202 calculated for vehicle 200, which is determined, as shown above, taking into account possible corrections by the driver (e.g. fixed steering angle value), in FIG. 3$a$ shows no crossing with the edge marking shown as the dashed line, whereas in FIG. 3$b$ such a crossing is present. According to that, in FIG. 3$b$ the driver is warned at the time shown or a vehicle intervention is undertaken, since the driver will probably not hold the vehicle in the lane only by normal corrections, while in FIG. 3$a$ the warning does not occur because the driver will be able to do so.

The extent of the assumed correcting motion of the driver may be a function of his state of attentiveness. In the case of a watchful driver, the correcting movement to be expected will lie, for example, at a steering angle of 10° and a transverse acceleration of 2 m/sec$^2$, whereas this value is clearly lower in the case of an inattentive driver. The state of attentiveness of the driver is derived, for example, from steering movements, accelerator movements, body posture, etc, and then, as a function of the degree of attentiveness, the correcting values are determined, and these are incorporated in the calculation of the future track of the vehicle.

Figure 4:
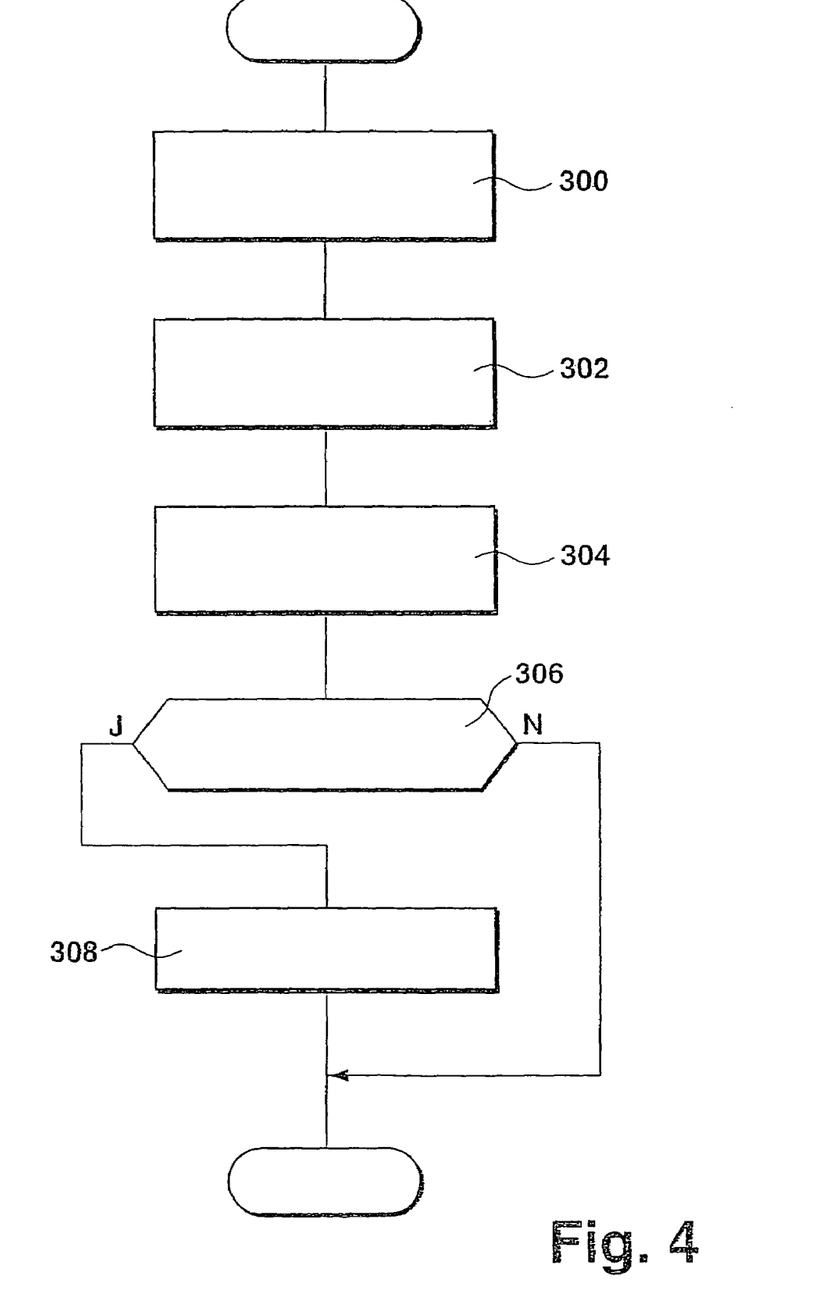
FIG. 4 shows a flow chart for a second exemplary embodiment.

A second exemplary embodiment, which further improves the accuracy and reliability of the recognition of the existing situation, is shown in the flow diagram in FIG. 4. This program, too, is run through at predefined time intervals. Analogously to the method depicted before, here too, in step 300, a function is read in that indicates the pattern of the lane marking (right and/or left side), which was derived from the image data of the image sensor system. In subsequent step 302, for first phase 4 (first time range, first distance range) one or more future tracks of the vehicle (e.g. track of the left vehicle edge and/or track of the right vehicle edge) are determined, for example, in the light of the vehicle speed and the steering angle and/or transverse acceleration, etc. In this phase, the assumption is made that there is no reaction by the driver, and consequently that no change in the steering angle or the transverse acceleration occurs. It has become apparent that a time range of 0.5 sec is suitable as the duration of this first phase. In this context, the track is also represented using a functional equation. In one exemplary embodiment, in step 302, based on the ascertained function, predefined points of the track of the vehicle, which, for example lie at predetermined distances, are determined, to which the vehicle will move towards the end of the first phase. Corresponding track points (at corresponding distances) have been ascertained with respect to the edge marking region. Then the second phase begins, for whose duration a time of 0.1 sec has been proven to be suitable. In this phase the driver reacts by turning the steering wheel away from the side marking. In this context, it is assumed that, at the actual time, a warning would have occurred. It is assumed that the steering wheel is turned by a certain value, or rather, that the vehicle travels a curve having a certain transverse acceleration. A 10° steering angle and 2 m/sec² have shown themselves as suitable values. Consequently, in step 304, starting from the end point of the track of the first phase, a track of the vehicle for the second phase is determined, an appropriate correction of the steering angle and/or of the transverse acceleration being taken into consideration in the determination of the parameters of the function. After the end of the second phase, it is assumed that the vehicle will continue on at an unchanged steering angle, so that in one exemplary embodiment (not shown in FIG. 4) an additional track calculation occurs. In the second phase also and possibly the third phase too, in one exemplary embodiment, individual track points are calculated at certain distances. After determination of the future track curve of the vehicle, checking is done in step 306 as to whether the function of the pattern of the lane marking has crossings with the track curves of the first or second phase. This is done by evaluating the function equations or by comparison of the coordinates of corresponding track points. If this is not the case, then it is assumed that a situation is not present in which the vehicle's leaving the lane is a threat. However, if a crossing is detected, then according to step 308 an optical and/or acoustical warning is given to the driver and/or a vehicle intervention for the automatic correction of the steering is ascertained and performed. The program is then ended and run through again at the next point in time.

Both in this method and the one depicted in the light of the first exemplary embodiment, the loudness of the warning, in the case of an acoustical warning, may be made variable and a function of the state of attentiveness of the driver.

Figure 5:
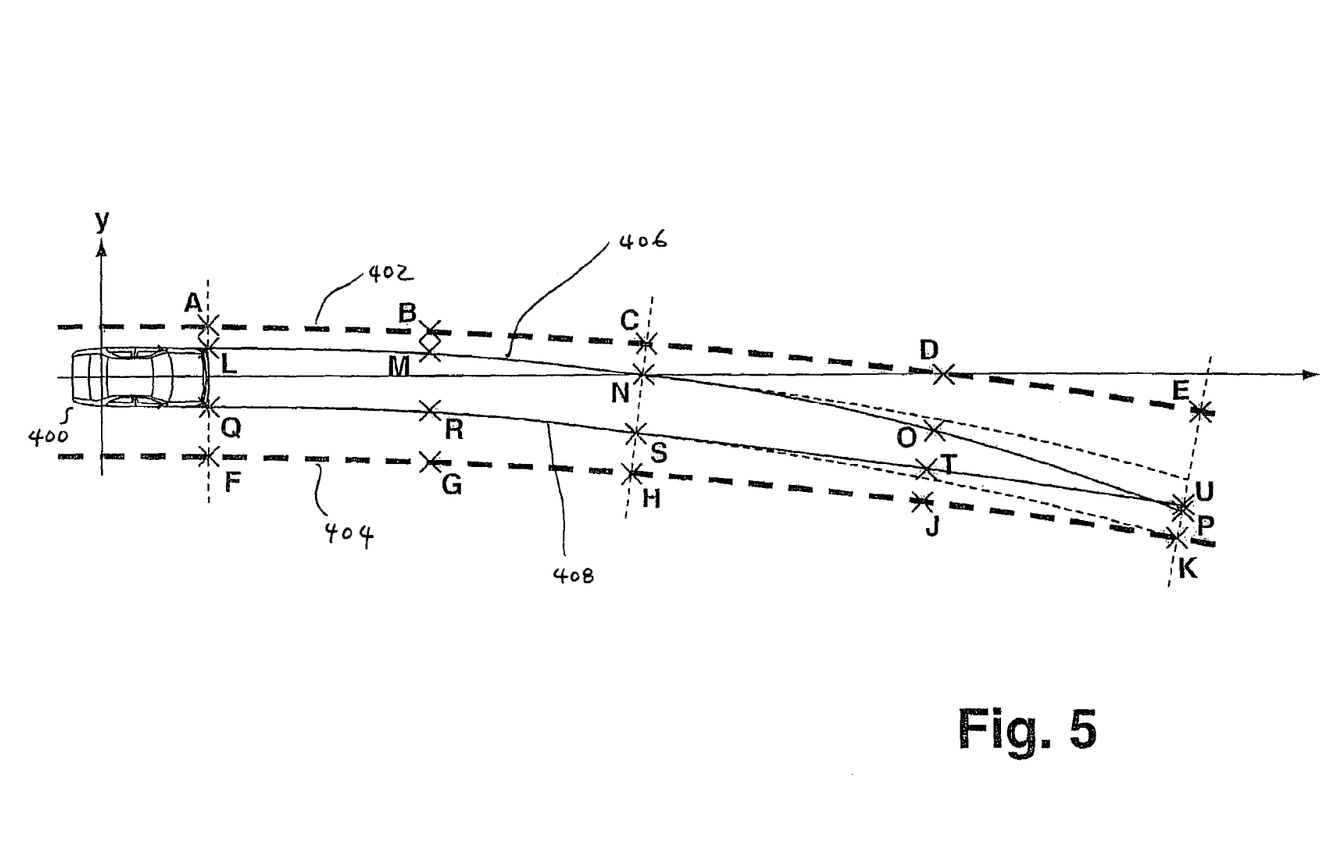
FIG. 5 shows a traffic situation in light of the method of FIG. 4.

The effectiveness of the method shown in FIG. 4 is made clear in the light of the illustration in FIG. 5. An x/y coordinate system is drawn in, whose centroid lies, for example in the middle of the vehicle. In this context, vehicle 400 travels in a traffic lane which is characterized by edge markings 402 and 404. Two tracks of the vehicle are also drawn in, one left and one right (406, 408) which describe the course of the left and the right vehicles edges. As was pointed out above, the course of the left and the right side markings (402, 404) relative to the vehicle are ascertained by a camera system. The course of the track markings is then shown with the aid of a mathematical equation, e.g., a third order power function. In this manner, the side markings are able to be calculated, for instance by the five points A, B, C, D, E for the left side markings, and by the points F, G, H, J, K for the right side markings. These points are selected so that, on the assumption of constant travel speed of the vehicle, they lie at certain time intervals ahead of the vehicle (e.g. A, F at 0 sec, B, G at 0.25 sec, C, H at 0.5 sec, D, J at 0.75 sec and E, K at 1 sec). To determine the tracks of the vehicle, paths 406, 408 are ascertained for the left and the right track of the vehicle. In this context, the travel speed and the current steering angle and/or the transverse acceleration of the vehicle make a difference. It is assumed that the vehicle travels at least in the next 0.5 sec using an unchanged steering angle (phase 1). This corresponds to the area between points A and C, and F and H, respectively. The track of the vehicle is also represented by a mathematical equation corresponding to the representation of the pattern of the lane markings. In this manner, within the extent of the first phase, points L, M, N may be determined for the left track and Q, R, S for the right track. In this context, the equations are set up in such a manner that the left edge of the vehicle travels through the curve from L to N, and the right edge from Q to S. It is further assumed that the driver, if he were warned at the point in time shown, will, after ca 0.5 sec turn his steering wheel by a certain magnitude (e.g. ca 10°) in the right direction, in order to avoid leaving the lane. In this manner, in phase 2 (area C to E and H to K, respectively, broken line area in phase 2) a new curve having a changed steering angle and/or a changed transverse acceleration is determined, which are determined by the points N, O and P and S, T and U, respectively. In this context, the track points of the vehicle tracks are calculated for the same distances as the track points of the lane markings, so that corresponding value pairs are formed. Thereafter, the patterns of the curves are compared (right track curve to right side edge curve, left track curve to left side marking curve) as to whether there are crossings or not. This occurs in the implementation shown by comparison of the y coordinate of corresponding track points. Thus, a warning on the left side occurs if either L lies above A, or M above B, or N above C, or O above D or P above E. Similarly, a warning on the right side occurs if either Q lies below F, or R below G, or S below H, or t below J or U below K.

As an alternative to this, the warning occurs only if one of the points L to P lies above one of points A to E by a certain measure, as well as if one of points Q to U lies below one of points F to K by a certain measure. In this context, the value of the measure that was mentioned may also be negative. So that even an approach to the lane marking generates a warning. In this manner, tolerances are taken into consideration.

In this context, depending on the exemplary embodiment, the warning may occur on both vehicle sides or only on one vehicle side.

In the exemplary embodiment just shown, the future track of the vehicle is calculated on the basis of a supposedly fixed steering of the driver. In practice it turns out that, in the case of some drivers, relatively many false warnings may occur if such a driver swings back and forth between the lane markings.

Therefore, in an additional exemplary embodiment the warning threshold for triggering the lane-leaving warning is dynamically changed by taking into consideration the degree of attentiveness of the driver when the calculation is made of the future track of the vehicle. The calculation of the future track of the vehicle, and therewith the warning threshold for triggering the warning becomes, in this context, a function of the behavior (performance characteristics) of the driver in the recent past. Depending on how much the vehicle travels curved tracks due to the steering movements of the driver, the calculation of the future track of the vehicle, and thereby also the warning threshold itself are modified. In the case of attentive drivers, this avoids many false warnings, but in the case of inattentive drivers, the warnings are triggered at the right time.

In general, in the above exemplary embodiment, a warning is triggered if a left warning boundary touches the left lane marking, or the right warning boundary touches the right lane marking. In this context, the warning boundary represents the future track of the vehicle, taking into consideration a possible estimated steering correction by the driver, if the latter drives closely towards the respective lane marking. The future track of the vehicle, and therewith the warning boundary are therefore curved. It has turned out that an inattentive driver, who is supposed to be warned by the system, as a rule makes very slight steering movements before leaving the lane. Therefore the vehicle travels a path having a relatively constant curvature. In the present exemplary embodiment, the warning boundaries are brought in with respect to each other if the curvature of the track that has been traveled by the vehicle has changed considerably (i.e. if comparatively strong steering movements have been executed by the driver).

This means that a greater curvature of the future track of the vehicle away from the lane marking is assumed. In response to a relatively constant curvature of the traveled track (and thus at very slight steering movements of the driver) the warning boundaries are broadened out, i.e. the possible future track of the vehicle is calculated using a lower change in the curvature.

Figure 6:
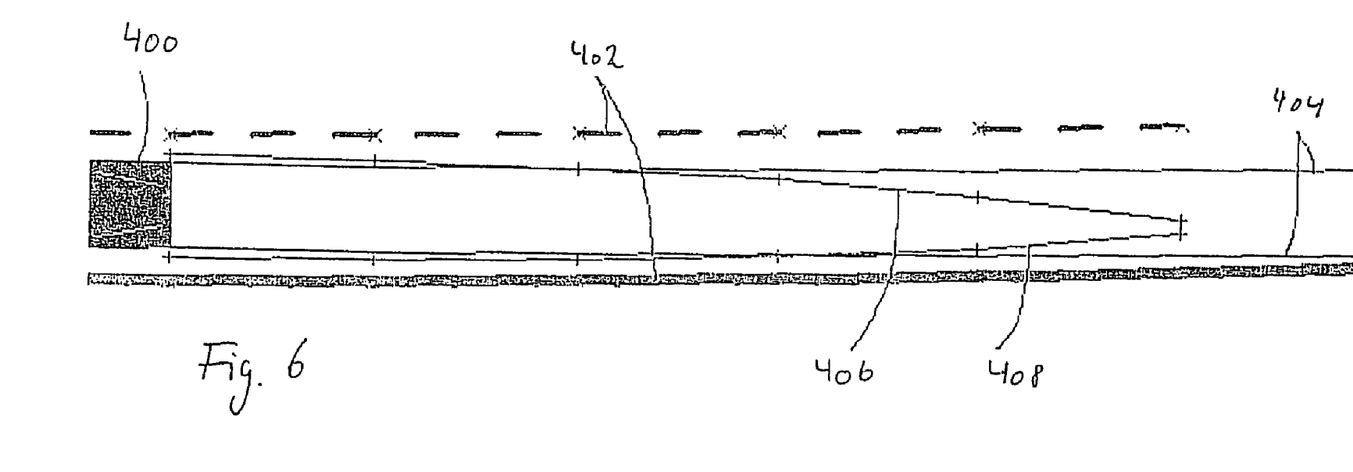
FIG. 6 shows an exemplary embodiment in which the calculation of the possible future path of the vehicle is a function of the degree of attentiveness of the driver and shows the situation for an attentive driver.
Figure 7:
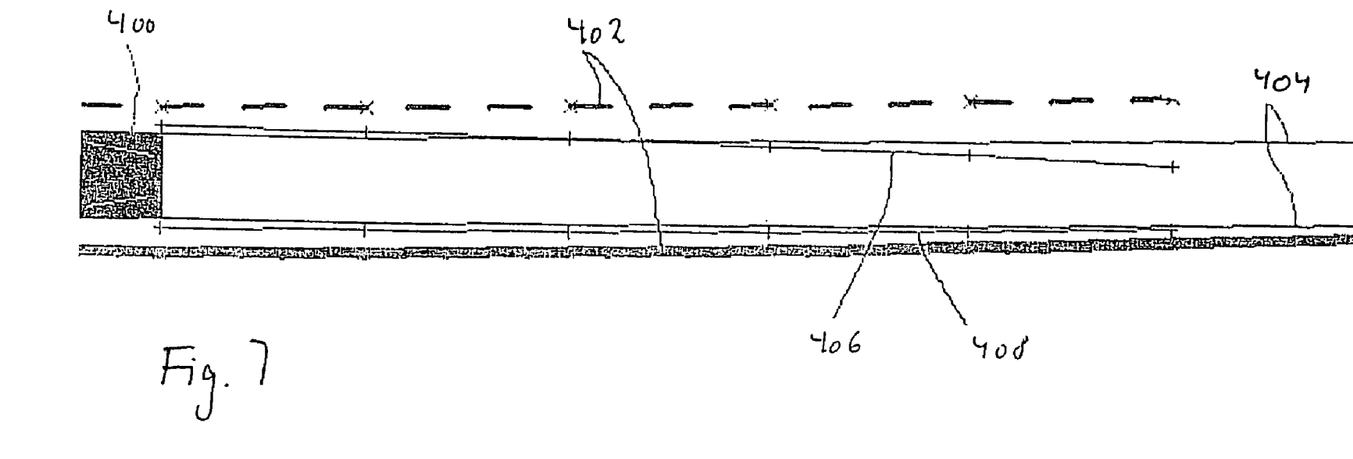
FIG. 7 shows an exemplary embodiment in which the calculation of the possible future path of the vehicle is a function of the degree of attentiveness of the driver and shows the situation for an inattentive driver.

In FIGS. 6 and 7 the vehicle is shown as 400. Furthermore, the left and right lane marking are shown as 402. 404 shows the future course of the vehicle without consideration of steering wheel changes, while the left and right warning boundaries are shown as 406 and 408, respectively. In this context, the left and right warning boundaries represent the future track of the vehicle while taking into consideration the correcting interventions of the driver. In this context, FIG. 6 shows the situation in response to an attentive driver, while FIG. 7 shows the situation in response to an inattentive driver. Consequently, in FIG. 6 the curvature of the vehicle's course changed greatly in the past. It is for that reason that the warning boundaries run close together. In other words, the courses of the warning boundaries show a great deviation from the future course of the vehicle without steering correction. If the vehicle approaches the right or the left lane marking, a warning occurs only at a late time. In FIG. 7 the situation is different. In the near past, the curvature of the course of the vehicle has hardly changed, and therefore the warning boundaries lie wide apart at a certain distance ahead of the vehicle. Thus, the courses of the warning boundaries here show a lesser deviation from the future course of the vehicle without steering correction. If the vehicle approaches closer to the lane marking, a warning is triggered in good time.

In the exemplary embodiment, this behavior is implemented in that, with the aid of steering movements, recorded, for example, from the signal of a steering angle sensor or a yaw rate sensor, a factor is determined using which the predefined correcting value is weighted. Consequently, when the calculation is made of the future track of the vehicle, and with that the course of the warning boundaries, a large correcting value is assumed in response to strong curvatures and steering movements, which leads to a greater change of the curvature of the future track, and with that, a drawing together of the warning boundaries, while in response to small steering movements in the past, a lower curvature factor is assumed, and consequently the warning boundaries lie far apart. In this context, the implementation occurs, as described in the case of the exemplary embodiments described above, within the scope of a computer program.

The drawing together of the warning boundaries that was shown is not only undertaken as a function of the past of the vehicle's course, but, in one exemplary embodiment, alternatively or additionally even at time periods in which, for example, the measurement of the lane markings is uncertain. Therefore, in such situations a large factor is specified, which leads to a great curvature of the warning boundaries, and consequently to a drawing closer together of the warning boundaries. This avoids unnecessary signals as a response to uncertain recording of lane markings. In other exemplary embodiments, besides recognition of the attentiveness of the driver in the light of the curvature of the course of the vehicle in the past, or in the light of steering movements, a different recognition of attentiveness, such as one derived from accelerator movements, head posture, etc, is used.

What is claimed is:

1. A method for at least one of providing driver information and performing a vehicle intervention when leaving a traffic lane, the method comprising:
    recording at least one boundary of the traffic lane;
    determining an anticipated track of a vehicle, taking into account a future, anticipated path correction by the driver;
    deriving at least one of the driver information and the vehicle intervention from the at least one boundary of the traffic lane and the anticipated track of the vehicle; and
    at least one of: a) providing the driver information when the vehicle one of leaves the traffic lane and threatens to leave the traffic lane; and b) performing the vehicle intervention when the vehicle one of leaves the traffic lane and threatens to leave the traffic lane.

2. The method of claim 1, wherein the anticipated track of the vehicle is determined based on a future, anticipated steering reaction away from side markings of the traffic lane.

3. The method of claim 1, wherein the at least one boundary is recorded using an image sensor system.

4. The method of claim 1, wherein a left future track of the vehicle and a right future track of the vehicle are determined, and the left future track and the right future track are compared to left edge markings and right edge markings of the traffic lane.

5. The method of claim 1, wherein the vehicle intervention includes an automatic intervention in steering in response to a threatened leaving of the traffic lane.

6. The method of claim 1, further comprising:
    determining a variable representing attentiveness of the driver; and
    determining a future steering correction by the driver that is used to determine at least one of the track of the vehicle and an extent of a warning of the driver based on the variable.

7. The method of claim 1, further comprising:
    determining a future possible track of the vehicle as a function of the course of the vehicle in the past.

8. The method of claim 7, wherein the course of the vehicle in the past is determined at least one of from at least one of the yaw rate and the steering angle and using the steering movements of the driver.

* * * * *